Figure 1:
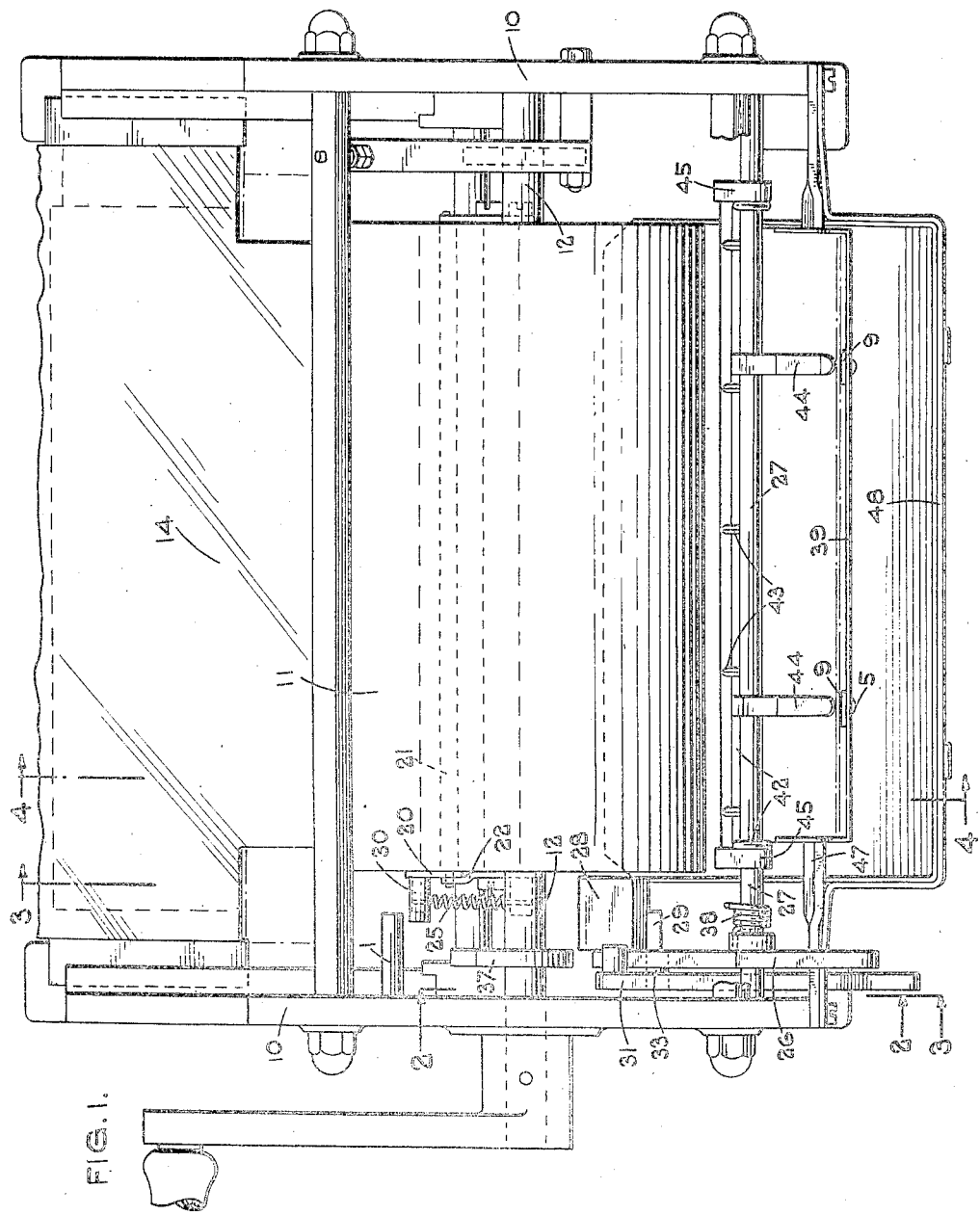

July 31, 1945.  F. R. FORD  2,380,744
DUPLICATING MACHINE
Filed Aug. 23, 1943   6 Sheets-Sheet 2

INVENTOR
Frank R. Ford.
BY
his ATTORNEY.

July 31, 1945.  F. R. FORD  2,380,744
DUPLICATING MACHINE
Filed Aug. 23, 1943  6 Sheets-Sheet 3
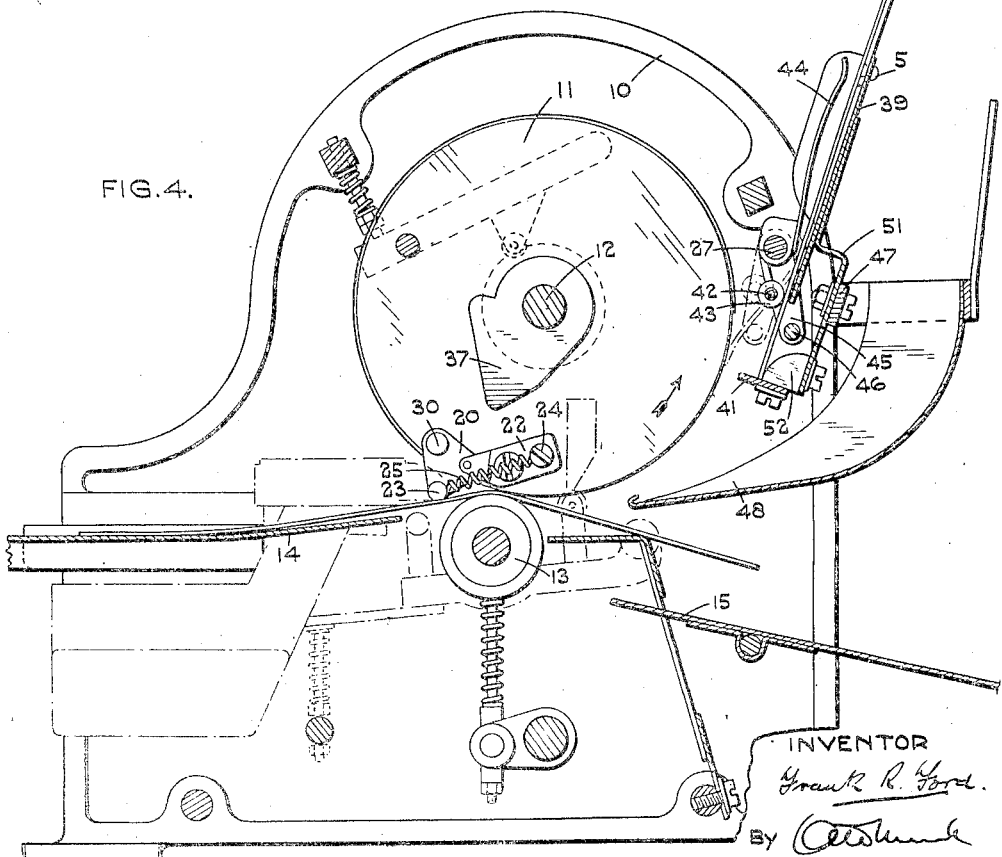

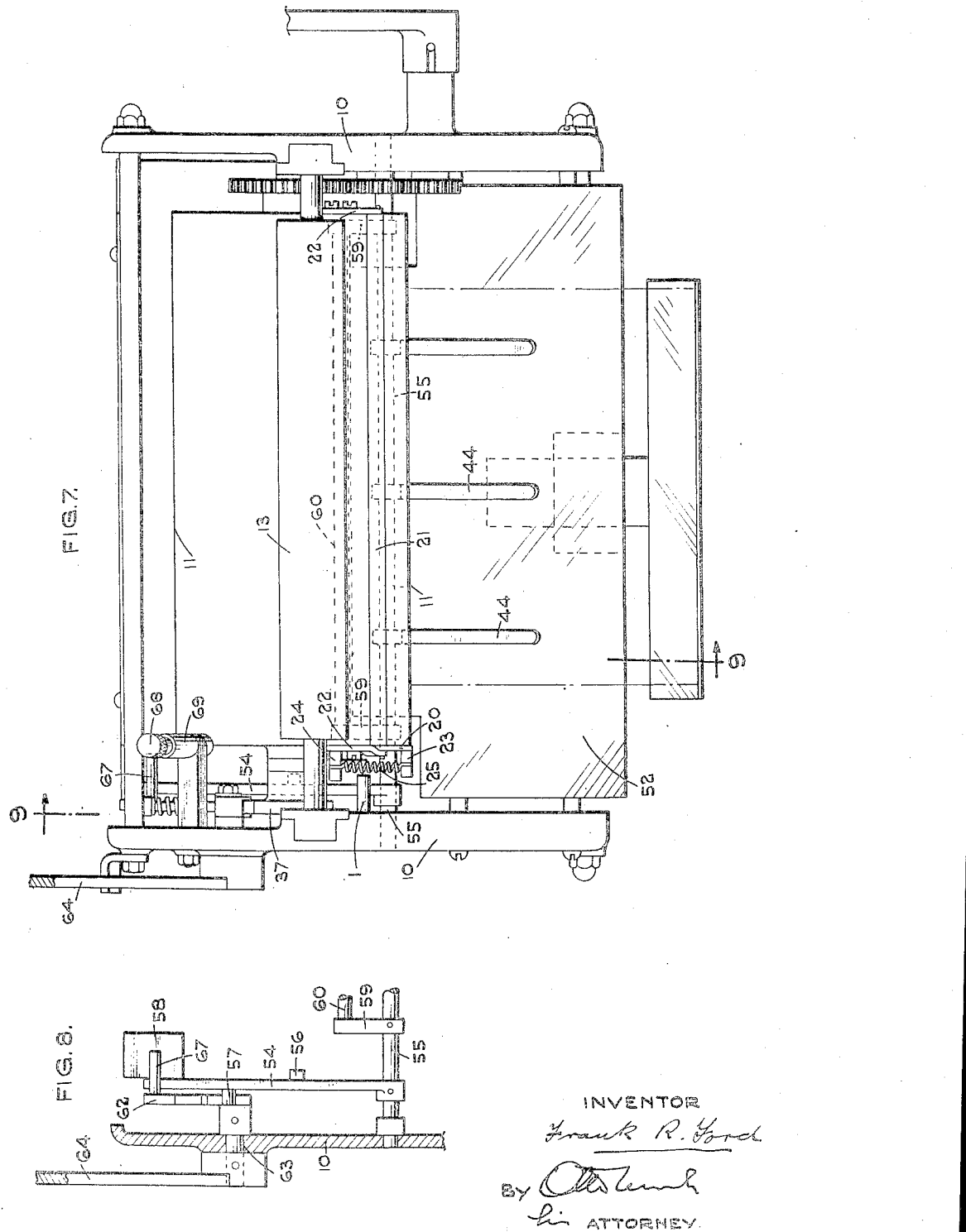

July 31, 1945. F. R. FORD 2,380,744
DUPLICATING MACHINE
Filed Aug. 23, 1943 6 Sheets-Sheet 6

INVENTOR
Frank R. Ford
BY
ATTORNEY.

Patented July 31, 1945

2,380,744

UNITED STATES PATENT OFFICE 2,380,744

DUPLICATING MACHINE

Frank Ronald Ford, Sparkbrook, Birmingham, England

Application August 23, 1943, Serial No. 499,616
In Great Britain June 24, 1942

9 Claims. (Cl. 101—132)

This invention relates to duplicating machines of the kind wherein a master sheet bearing the matter to be reproduced in reverse is clamped on a cylinder which is rotated in contact with the pressure roller, the copy sheets being moistened and fed between the cylinder and the pressure roller in contact with the master sheet.

The present invention relates to machines of this type, wherein the master sheet is attached to the cylinder by having its leading edge engaged under a clamping strip mounted longitudinally on the periphery of the cylinder, this clamping strip being capable of opening and closing movement, and means being provided for automatically releasing the master sheet from the cylinder and inserting a fresh master sheet when required.

The object of the present invention is to provide improved or simplified mechanism for automatically effecting the change of master sheet.

According to the present invention, the clamp for holding the master sheet in position on the cylinder is controlled by mechanism on the cylinder by which it is retained alternately both in its open and in its closed position, and actuating means are provided on the machine, which are normally in an inoperative position but which can be moved into an operative position at will, and returned to the inoperative position automatically, for engaging the said mechanism during the rotation of the cylinder and moving the controlling mechanism of the clamp first to open it and then to close it at predetermined positions of the cylinder, and a support is provided adjacent to the cylinder for the fresh master sheet, the arrangement being such that during normal working, the actuating means remains in an inoperative position, but when it is desired to effect a change of master sheet, a fresh master sheet is placed on the support and the actuating means is operated by hand to bring it into the operative position, causing it to open the clamp as the leading edge of the master sheet on the cylinder approaches the support holding the fresh master sheet, so that the master sheet on the cylinder drops away and the open clamp on the cylinder engages the leading edge of the fresh master sheet on the support, after which the actuating means closes the clamp on to the said edge of the fresh master sheet, and the rotation of the cylinder causes the fresh master sheet to become wrapped around the cylinder.

The controlling mechanism for the clamp may consist of a spring loaded lever attached to a clamping strip, the lever being provided with an abutment and being spring loaded, the abutment being engaged by the actuating means to move the lever over a dead centre position.

The actuating means may comprise a lever pivoted on the machine frame and having two spaced laterally projecting abutments for engaging with the controlling means of the clamp.

The actuating means may also include a retaining lever pivoted on the frame of the machine and adapted to engage a member on the actuating lever for releasably retaining it in the operative position.

The support for the new master sheet may be of channel form at the end adjacent the cylinder and a loading bar may be provided acting on the side of the new master sheet which is nearest to the cylinder.

The actuating lever may be fixed on a pivot extending parallel to the cylinder and the said pivot may carry one or more spring arms so that when the actuating lever is moved into its operative position, the said arm or arms are rocked and caused to grip the new master sheet against the tray.

Further the pivot to which the actuating lever is fixed may be provided with one or more cranks carrying a bar engaging behind the new master sheet on the support or tray so as to move its leading edge into close proximity to the periphery of the cylinder when the actuating lever is moved into its operative position.

The clamp opening means may be timed to open the clamp after the leading edge of the master sheet on the cylinder has left the line of contact between the cylinder and the pressure roller and a chute may be provided adjacent the cylinder and on the same side thereof as a receiving tray for the copy sheets, the edges of the chute and the tray being spaced one above the other so that the last copy sheet, which is released at a lower level than that on which the master sheet is released passes on to the receiving tray, while the discarded master sheet passes into the chute.

The invention also incorporates the provision of one or more arms pivoted on the surface of a feed tray, the pivots being at right angles to the plane of the tray and the arms being movable to form an extension of the tray and also being capable of being folded so that they lie within the boundaries of the tray.

A safety stud may be provided on the frame of the machine adapted to operate the master clamp controlling means so as to close the clamp automatically should it inadvertently be left in the open position while the cylinder is being rotated.

The invention is illustrated in the accompanying drawings wherein, one construction is shown in Figures 1 to 6, and another construction is shown in Figures 7 to 12.

In the construction shown in Figures 1 to 6 the machine is of the kind wherein the pressure roller is situated under the cylinder and in the construction shown in Figures 7 to 12 the pressure roller is situated over the cylinder.

Figure 2:
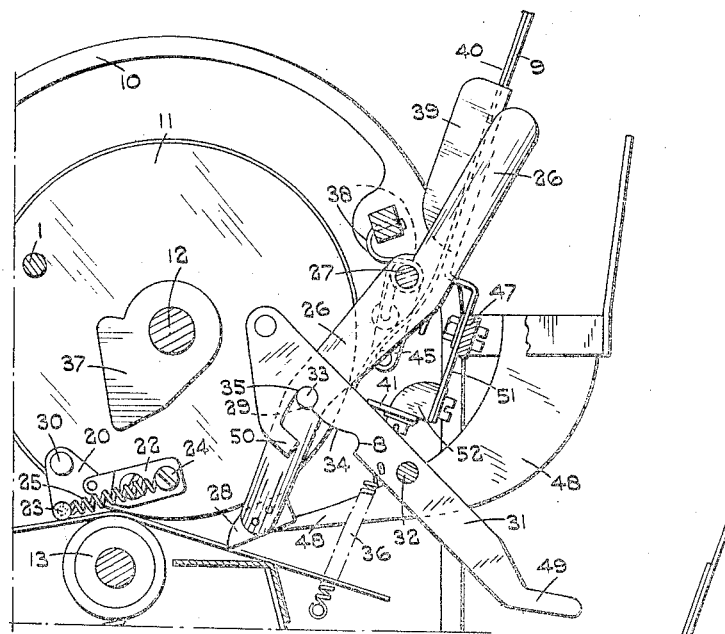
Figure 3:
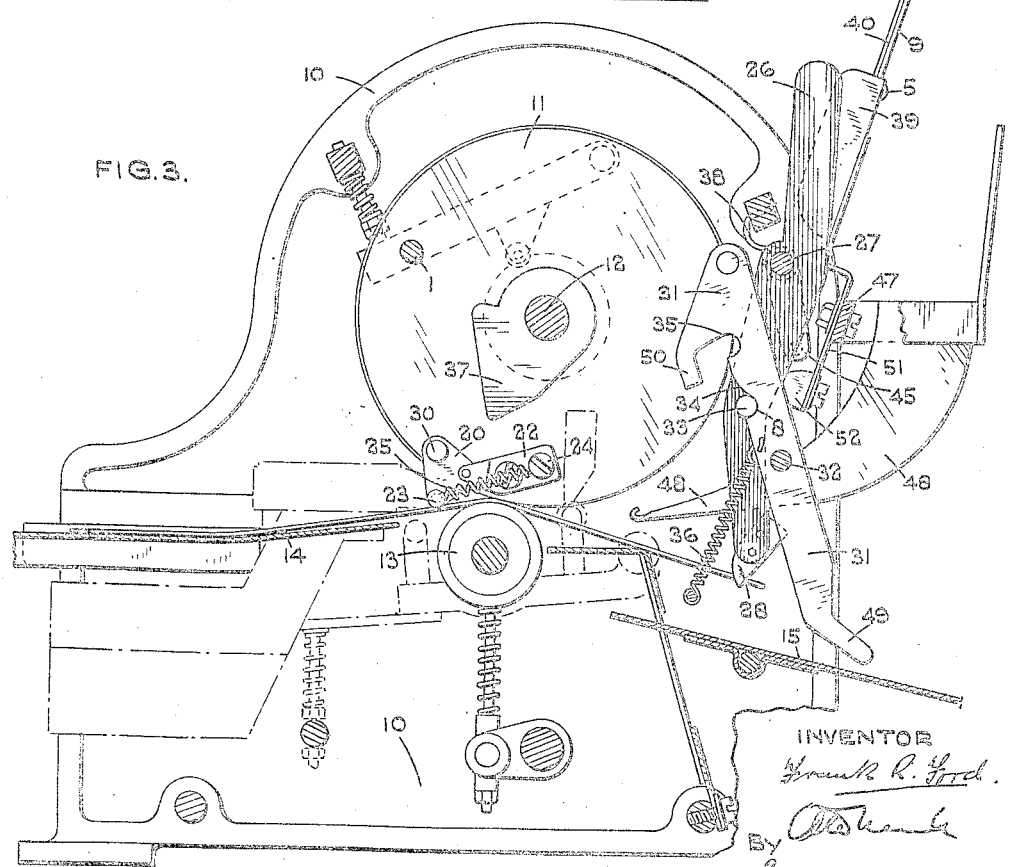
Figure 9:
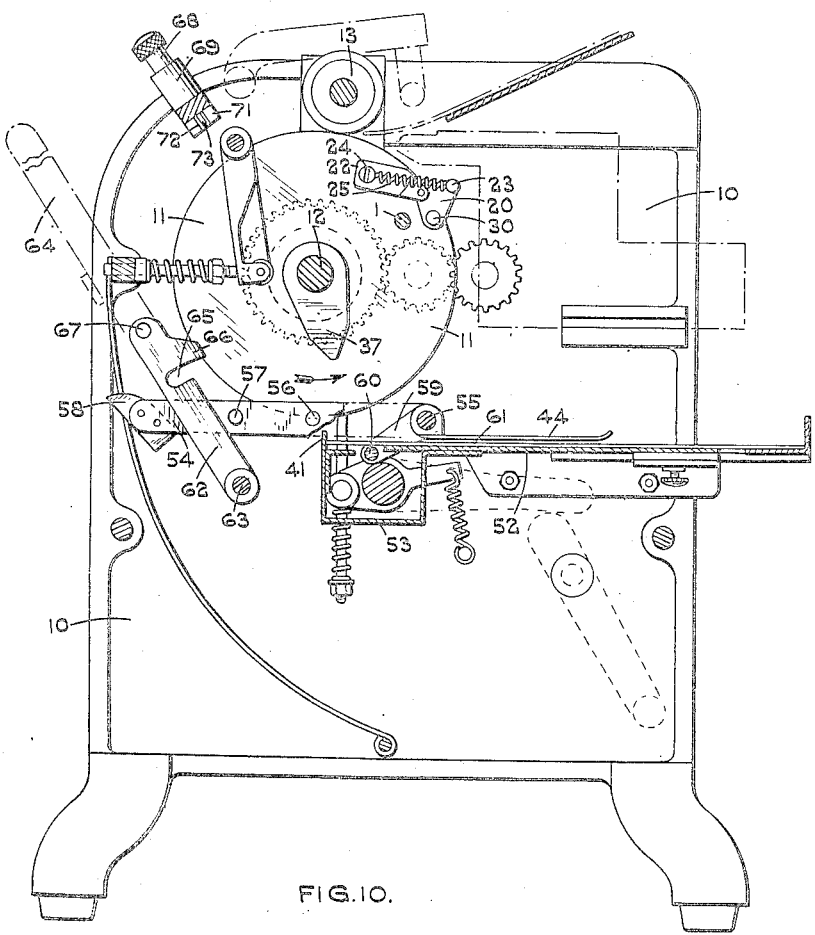
Figure 10:
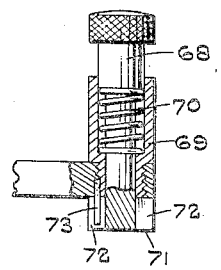
Figure 11:
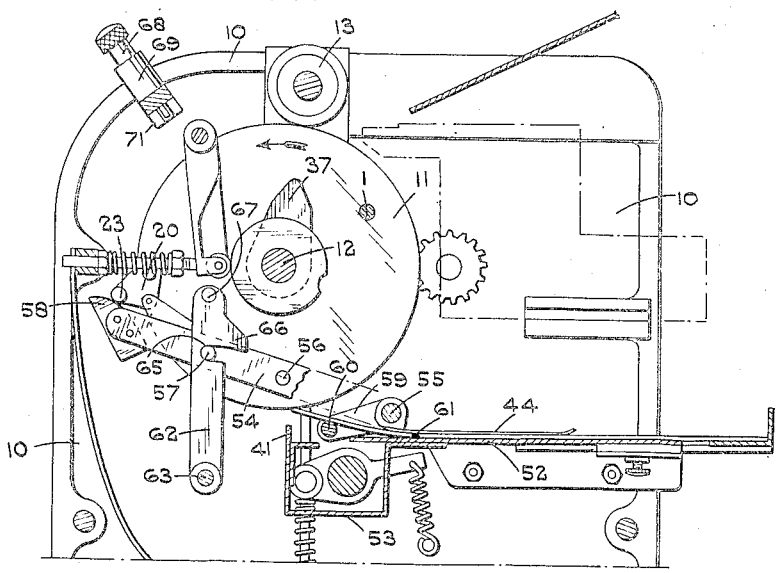
Figure 12:
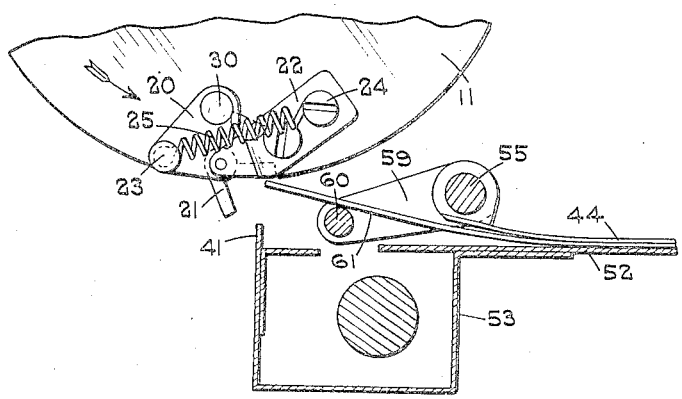

Figure 1 is a plan view.
Figure 2 is a section on line 2—2 of Figure 1.
Figure 3 is a section on line 3—3 of Figure 1.
Figure 4 is a section on line 4—4 of Figure 1.
Figure 5 is a sectional view showing the clamp and a part of the cylinder.
Figure 6 is a sectional view of a part of the machine showing the clamp in the open position ready to pick up the new master sheet.
Figure 7 is a plan view.
Figure 8 is a sectional view in side elevation.
Figure 9 is a sectional view on line 9—9 of Figure 7.
Figure 10 is a sectional view showing a detail of construction.
Figure 11 is a view partly in section taken at right angles to the axis of the cylinder.
Figure 12 is a fragmentary view on an enlarged scale showing the clamp in its open position ready to pick up the new master sheet.

In the construction shown in Figures 1 to 6, the side plates of the machine are shown at 10, the cylinder at 11, the cylinder shaft at 12, the pressure roller at 13, the feed tray for copy sheets at 14, and the receiving tray for copy sheets at 15.

Known means are provided for moistening the copy sheets on the upper side and known means are also provided for adjusting the pressure of the pressure roller 13 towards the cylinder 11.

The controlling mechanism for the clamp consists of a lever 20 attached to a clamping strip 21 which pivots in brackets 22 on the ends of the cylinder, this lever 20 being provided with two laterally projecting pins, to one 23 of which a spring 25 is attached, the opposite end of the spring being attached to a pin 24 fixed to the bracket 22 on the end of the cylinder, and the arrangement is such that the spring 25 throws over a dead-centre position when the clamp moves from its closed to its open position and vice versa. Thus when the clamp is closed, the spring is operating to keep it closed, and when the clamp is open, the spring is operating to keep it in the open position. The other pin 30 forms the lateral abutment on the lever 20 by which the actuating means is adapted to operate the lever.

The actuating means preferably comprise a lever 26 pivoted at 27 to the machine frame and having two spaced laterally projecting abutments 28, 29, which are engaged in succession by the lateral abutments 23 and 30 on the lever 20 controlling the clamp, the first engagement by the pin 23 serving to open the clamp and the second engagement by the pin 30 serving to close it again.

The abutment 28 on the operating lever may be formed as a cam plate as shown, and this cam plate is encountered by the lateral abutment 23 on the lever 20 so that as the cylinder rotates the clamp is opened. The cam plate 28 is spaced apart from the second abutment 29 on the actuating lever, which second abutment is formed as a laterally projecting pin which is encountered by the abutment 30 as the cylinder rotates so that the lever 20 is moved back to the other position corresponding with the closed position of the clamp.

Associated with the actuating lever 26 is a retaining lever 31. This is pivoted at 32 to the inner side of one of the side plates of the frame of the machine, and it is engaged by a lateral projection 33 on the actuating lever. One edge of this retaining lever 31 is provided with a cam surface 34 over which the said lateral projection 33 can work, and the cam surface leads to a notch 35 which engages over the lateral projection on the actuating lever when the latter has been moved into its operative position so that the retaining lever, upon which a light spring 36 operates, retains the actuating lever in its operative position until the retaining lever has been knocked aside by a projection 37 on the cylinder to release the actuating lever and to allow it to move back into its inoperative position under the influence of a torsion spring 38. The edge of the retaining lever 31 is provided with a second notch 8 which engages over the lateral projection 33 on the actuating lever when the latter is in its inoperative position. Further the retaining lever is provided with a finger piece 49 by which it can be operated by hand when required to allow the actuating lever to move back into the inoperative position. The retaining lever 31 is provided with a finger 50 which limits the movement which can be imparted to it by the operator.

The pivot 27 on which the actuating lever 26 is fixed is mounted for oscillation in the side plates of the machine and extends across the width of the machine parallel to the axis of the cylinder. This rocking spindle 27 is situated adjacent the edge of a tray or support 39 provided for the new master sheet 40, and this support may take the form of an inclined tray as shown having a lip or flange 41 at the edge adjacent to and directed towards the cylinder, this lip or flange together with a loading bar 42 retaining the sheet 40 in a definite position when it is first placed on the tray.

The loading bar 42 is freely suspended from the rocking pivot 27 and is of U shape with its two arms hung on the rocking pivot. This loading bar is provided with a number of rollers or flanges 43, the peripheries of which bear against the new master sheet 40 and guide it to the lip or flange of the support.

The rocking pivot 27 carries a pair of spring arms 44 so that when the actuating lever is moved into its operative position, these arms are rocked and caused lightly to grip the new master sheet against the tray 39.

Further, the rocking pivot 27 is provided with a pair of cranks 45 which carry a bar 46 adapted to move the leading edge of the new master sheet 40 into close proximity to the periphery of the cylinder when the actuating lever is moved into its operative position.

During this action the leading edge of the master sheet is moved away from the flange 41 of the tray, and to prevent it from sliding between the tray and the cylinder, the spring arms are rocked and caused lightly to grip the master.

The lower part of the tray adjacent the cylinder is of channel section as shown at 51 in order to allow of the necessary space for the cranks 45 and bar 46. The lip or flange of the tray may be made separately and attached to the tray by means of blocks 52.

In operation, assuming that it is desired to effect a change of master sheet, a new master sheet is dropped on to the tray 39, the actuating lever 26 is moved into the operative position by hand when the cylinder reaches the position at which the copy sheet is usually fed in, and subsequent operation of the handle in the same direction as that which it takes during the normal operation of the machine, causes the successive operation of the clamping strip on the cylinder first to open and release the master sheet on the cylinder, then to pick up the leading edge of the new master sheet, and then to close on to the edge of the new master sheet. The operation of the clamp is effected by the lateral abutments on the actuating lever.

After the clamp has closed on to the leading edge of the new master sheet, the lateral abutment on the end of the cylinder comes into contact with a lateral abutment on the retaining lever and moves it so as to cause both the retaining lever and the actuating lever to spring back into their inoperative positions.

The movements of the actuating lever into its operative position actuates the spring arms which grip the new master sheet on to the tray and also actuates the bar carried by the cranks on the rocking spindle to move the leading edge of the new master sheet into contact or into close proximity with the cylinder. When the actuating lever is automatically moved back into its inoperative position, the spring arms, the bar carried by the cranks, and the loading bar automatically return to their initial positions.

The tray 39 provided for the fresh master sheet is disposed substantially tangentially to the cylinder and is attached to a strip 47 which is fastened by screws to the edges of the side plates of the machine.

As will be seen from the drawings the means for controlling the opening of the master sheet clamp, opens the clamp after the leading edge of the master sheet has left the line of contact between the cylinder and the pressure roller and a chute 48 is provided adjacent to the cylinder and on the same side as the receiving tray 15, the edges of the chute 48 and the tray 15 being spaced one above the other so that the last copy sheet which is released, at a lower level than that at which the master sheet is released, passes on to the tray 15 while the discarded master sheet passes into the chute 48.

The tray 39 is relatively short and it is provided with a pair of arms 9 pivoted at 5, the axes of the pivots being at right angles to the surface of the tray. The arms 9 form an extension of the tray when in the position shown in Figure 3 but can be folded down to lie within the boundaries of the tray when required.

A projection 37 on the cylinder which releases the actuating lever by knocking aside the retaining lever is so shaped with converging operative surfaces that it will operate for either direction of rotation of the cylinder.

A safety stud 1 may be provided mounted in one of the side plates 10 of the machine and projecting into the path of the lever controlling the clamp so that if the clamp should by inadvertence be in the open position when the cylinder is rotating it will automatically be closed by the stud 1 before the clamp encounters the pressure roller 13.

In the construction shown in Figures 7 to 12 the essential parts of the machine are mainly the same as in the construction shown in Figures 1 to 6, but the pressure roller 13 in this construction is above the cylinder instead of being below it and the tray or support for the new master sheet is horizontal instead of being almost vertical. The tray or support is shown at 52 and as in the other construction it is provided with a channel section part 53 near the cylinder.

The actuating lever is shown at 54 and is fixed to a pivot 55 which can oscillate in suitable bearings, the lever 54 being provided with laterally projecting pins 56, 57 and 58. The pivot 55 of the actuating lever also carries a pair of arms 59 carrying the bar 60 which raises the leading edge of the new master sheet 61 into contact with the cylinder.

The clamp on the cylinder and the means by which it is operated are the same as in the previously described construction as also is the part 37 which operates on the retaining lever 62. The retaining lever is pivoted to one of the side plates at 63 and the pivot extends through the side plate and is provided with an operating lever 64 on the outer side of the side plate.

The retaining lever is further provided with a slot 65 and a finger 66 and the arrangement is such that when the operating lever 64 is moved in a clockwise direction as seen in Figure 9, one of its edges acts upon the pin 57 and raises the actuating lever into the position shown in Figure 11 until the pin 57 enters the slot 65. The clockwise movement of the levers 64 and 62 is limited by the finger 66 coming into contact with the pin 57.

Figure 11 shows the actuating lever 54 in the operative position in which the cam 58 and the pin 56 operate to open and close the clamp in the manner described with reference to Figures 1 to 6.

The retaining lever is provided with a laterally projecting pin 67 which is acted upon by a cam-like projection 37 on the cylinder so that the actuating and retaining levers are thereby returned to their inoperative position, the retaining lever being knocked backwardly and the actuating lever dropping by gravity.

The safety stud 1 serves the same purpose as the same stud shown in Figures 1 to 6, i. e. it closes the clamp, should be clamp be left open when the cylinder is rotating and it closes the clamp before it can encounter the pressure roller 13.

Should it be desired to open the clamp when the clamp has passed the pressure roller 13 and is in a position at the upper part of the cylinder so that the manual insertion or extraction of a master sheet can be made if desired, a push pin 68 may be provided mounted in a guide 69 fixed to one of the side plates of the machine. This push pin is acted upon by a spring 70 which tends to move it into its withdrawn position but it is provided with a head 71 which is slotted as shown at 72, the slots co-operating with a pin 73 which may be mounted in the side guide 69, the arrangement being such that the pin can be pushed inwardly towards the cylinder and given a quarter turn when it will retain its projected position and will act upon the clamp controlling lever so as to open the clamp as the clamp passes under the pin.

What I claim then is:

1. In a duplicating machine a stationary frame, a cylinder rotatably mounted in said frame, a mechanical clamp on said cylinder adapted when open to receive the edge of a master sheet, and when closed to secure same to said cylinder, actuating means on said frame biassed to a normal inoperative position but capable of being moved manually into an operative position, said actuating means when in the operative position being adapted to effect automatic opening and closing movements of said clamp at predetermined angular positions during rotation of said cylinder, means for automatically retaining said actuating means in the operative position after movement thereto, means on said cylinder for tripping said retaining means after closing of said clamp to allow said actuating means to regain its normal inoperative position, means for supporting a fresh master sheet with one edge adjacent to, but clear of, said cylinder, loading means associated with said clamp-actuating means adapted, on movement of the latter to its operative position, to bring the edge of said fresh master sheet into a position suitable for reception in said clamp, and a gripping device connected to said loading means and adapted on operation of the latter to resist movement of said fresh master sheet relatively to said supporting means, said loading means and gripping device automatically returning to an inoperative position simultaneously with said clamp-actuating means.

2. In a duplicating machine a stationary frame, a cylinder rotatably mounted in said frame, a mechanical clamp on said cylinder adapted when open to receive the edge of a master sheet and when closed to secure same to said cylinder, a spring-loaded tumbler lever on said cylinder whereby said clamp may be moved to and automatically retained in either of its extreme positions, actuating means on said frame biassed to a normal inoperative position but capable of being moved manually into an operative position, said actuating means, when in the operative position, being adapted to effect automatic opening and closing movements of said clamp at predetermined angular positions during rotation of said cylinder, means for automatically retaining said actuating means in the operative position after movement thereto, means on said cylinder for tripping said retaining means after closing of said clamp to allow said actuating means to regain its normal inoperative position, means for supporting a fresh master sheet with one edge adjacent to, but clear of, said cylinder, loading means associated with said clamp-actuating means adapted, on movement of the latter to its operative position, to bring the edge of said fresh master sheet into a position suitable for reception in said clamp, and a gripping device connected to said loading means and adapted on operation of the latter to resist movement of said fresh master sheet relatively to said supporting means, said loading means and gripping device automatically returning to an inoperative position simultaneously with said clamp-actuating means.

3. In a duplicating machine a stationary frame, a cylinder rotatably mounted in said frame, a mechanical clamp on said cylinder adapted when open to receive the edge of a master sheet and when closed to secure same to said cylinder, a spring-loaded tumbler lever on said cylinder whereby said clamp may be moved to and automatically retained in either of its extreme positions, an actuating lever pivoted upon said frame, said actuating lever being biassed into a normal inoperative position but capable of being moved manually into an operative position, lateral projections on said actuating lever adapted in the operative position of the latter to enter the orbit of said tumbler lever and co-operating with the latter to effect automatic opening and closing movements of said clamp at predetermined angular positions during rotation of said cylinder, means for automatically retaining said actuating lever in the operative position after movement thereto, means on said cylinder for tripping said retaining means after closing of said clamp to allow said actuating lever to regain its normal inoperative position, means for supporting a fresh master sheet with one edge adjacent to, but clear of, said cylinder, loading means associated with said actuating lever adapted, on movement of the latter to its operative position, to bring the edge of said fresh master sheet into a position suitable for reception in said clamp, and a gripping device connected to said loading means and adapted on operation of the latter to resist movement of said fresh master sheet relatively to said supporting means, said loading means and gripping device automatically returning to an inoperative position simultaneously with said actuating lever.

4. In a duplicating machine, a stationary frame, a cylinder rotatably mounted in said frame, a mechanical clamp on said cylinder adapted when open to receive the edge of a master sheet and when closed to secure same to said cylinder, a spring-loaded tumbler lever on said cylinder whereby said clamp may be moved to and automatically retained in either of its extreme positions, an actuating lever pivoted upon said frame, said actuating lever being biassed into a normal inoperative position but capable of being moved manually into an operative position, lateral projections on said actuating lever adapted in the operative position of the latter to enter the orbit of said tumbler lever and co-operating with the latter to effect automatic opening and closing movements of said clamp at predetermined angular positions during rotation of said cylinder, a second lever pivoted upon said frame alongside said actuating lever, a further lateral projection on said actuating lever, said second lever being biassed into contact with said further lateral projection and having a recess which receives the latter when said actuating lever is moved to the operative position, so that said actuating lever is automatically retained in such position, means on said cylinder for disengaging said retaining lever from said further lateral projection after closing of said clamp to allow said actuating lever to regain its normal inoperative position, means for supporting a fresh master sheet with one edge adjacent to, but clear of, said cylinder, loading means associated with said actuating lever adapted, on movement of the latter to its operative position, to bring the edge of said fresh master sheet into a position suitable for reception in said clamp, and a gripping device connected to said loading means and adapted on operation of the latter to resist movement of said fresh master sheet relatively to said supporting means, said loading means and gripping device automatically returning to an inoperative position simultaneously with said actuating lever.

5. In a duplicating machine a stationary frame, a cylinder rotatably mounted in said frame, a mechanical clamp on said cylinder adapted when open to receive the edge of a master sheet and when closed to secure same to said cylinder, a spring-loaded tumbler lever on said cylinder whereby said clamp may be moved to and automatically returned in either of its extreme positions, an actuating lever pivoted upon said frame, said actuating lever being biassed into a normal inoperative position but capable of being moved manually into an operative position, lateral projections on said actuating lever adapted in the operative position of the latter to enter the orbit of said tumbler lever and co-operating with the latter to effect automatic opening and closing movements of said clamp at predetermined angular positions during rotation of said cylinder, a second lever pivoted upon said frame alongside said actuating lever, a further lateral projection on said actuating lever, said second lever being biassed into contact with said further lateral projection and having a recess which receives the latter when said actuating lever is moved to the operative position, so that said actuating lever is automatically retained in such position, a cam on said cylinder adapted to move said retaining lever angularly after closing of said clamp in a manner such that said recess is disengaged from said further lateral projection and said actuating lever is allowed to regain its normal inoperative position, means for supporting a fresh master sheet with one edge adjacent to, but clear of, said cylinder, loading means associated with said actuating lever adapted, on movement of the latter to its operative position, to bring the edge of said fresh master sheet into a position suitable for reception in said clamp, and a gripping device connected to said loading means and adapted on operation of the latter to resist movement of said fresh master sheet relatively to said supporting means, said loading means and gripping device automatically returning to an inoperative position simultaneously with said actuating lever.

6. In a duplicating machine a stationary frame, a cylinder rotatably mounted in said frame, a mechanical clamp on said cylinder adapted when open to receive the edge of a master sheet and when closed to secure same to said cylinder, an actuating lever pivoted upon said frame, said actuating lever being biassed into a normal inoperative position but capable of being moved manually into an operative position, said actuating lever when in the operative position being adapted to effect automatic opening and closing movements of said clamp at predetermined angular positions during rotation of said cylinder, means for automatically retaining said actuating lever in the operative position after movement thereto, means on said cylinder for tripping said retaining means after closing of said clamp to allow said actuating lever to regain its normal inoperative position, means for supporting a fresh master sheet with one edge adjacent to, but clear of, said cylinder, a pair of crank arms mounted to oscillate about a common axis in unison with said actuating lever, a loading bar connecting the free ends of said crank arms and extending transversely of said supporting means, said loading bar being adapted, on movement of said actuating lever into its operative position, to bring the edge of said fresh master sheet into a position suitable for reception in said clamp, and a gripping device connected to said loading means and adapted on operation of the latter to resist movement of said fresh master sheet relatively to said supporting means, said loading bar and gripping device automatically returning to an inoperative position simultaneously with said actuating lever.

7. In a duplicating machine a stationary frame, a cylinder rotatably mounted in said frame, a mechanical clamp on said cylinder adapted when open to receive the edge of a master sheet and when closed to secure same to said cylinder, a spindle mounted in said frame parallel to said cylinder, an actuating lever fixed on said spindle, said actuating lever being biassed into a normal inoperative position but capable of being moved manually into an operative position, said actuating lever when in the operative position being adapted to effect automatic opening and closing movements of said clamp at predetermined angular positions during rotation of said cylinder, means for automatically retaining said actuating lever in the operative position after movement thereto, means on said cylinder for tripping said retaining means after closing of said clamp to allow said actuating lever to regain its normal inoperative position, means for supporting a fresh master sheet with one edge adjacent to, but clear of, said cylinder, a pair of spaced crank arms fixed to said spindle, a loading bar connecting the free ends of said crank arms and extending transversely of said supporting means, said loading bar being adapted, on movement of said actuating lever into its operative position, to bring the edge of said fresh master sheet into a position suitable for reception in said clamp, and resilient fingers fixed on said spindle and extending at the side thereof remote from said crank arms, said fingers being adapted on operation of said loading bar to resist movement of said fresh master sheet relatively to said supporting means, said loading bar and fingers automatically returning to an inoperative position simultaneously with said actuating lever.

8. In a duplicating machine a stationary frame, a cylinder rotatably mounted in said frame, attachment means on said cylinder for one edge of a master sheet, a roller co-operating with said cylinder and adapted to bring moistened copy sheets into pressure contact with the master sheet on said cylinder a receiving tray for said copy sheets, manually-controlled mechanism for automatically releasing the master sheet from said cylinder as the latter rotates, means for supporting a fresh master sheet with one edge adjacent to, but clear of, said cylinder, means for feeding said fresh master sheet to said attachment means and for operating said attachment means to grip said fresh master sheet, and a chute adapted to receive the discarded master sheet at the same side of said cylinder as said copy sheet receiving tray, the end of said chute nearest said cylinder being disposed at a higher level than the corresponding end of said tray and said releasing means being timed to operate after the leading edge of the master sheet to be discarded has passed the nip between said cylinder and said roller.

9. In a duplicating machine a stationary frame, a cylinder rotatably mounted in said frame, attachment means on said cylinder for one edge of a master sheet, a roller co-operating with said cylinder and adapted to bring moistened copy sheets into pressure contact with the master sheet on said cylinder, a receiving tray for said copy sheets, said receiving tray being disposed below the level of the nip between said cylinder and said roller, manually-controlled mechanism for automatically releasing the master sheet from said cylinder as the latter rotates, said mechanism being timed to operate after the leading edge of the master sheet on the cylinder has passed said nip, means for supporting a fresh master sheet with one edge adjacent to, but clear of, said cylinder, means for feeding said fresh master sheet to said attachment means and for operating said attachment means to grip said fresh master sheet, and a chute adapted to receive the discarded master sheet, said chute and said master sheet supporting means being both disposed at the same side of said cylinder as said tray but at a higher level, said supporting means being arranged in convergent relationship with said chute and somewhat below the latter.

FRANK RONALD FORD.